US011883862B2

United States Patent
Zeng et al.

(10) Patent No.: US 11,883,862 B2
(45) Date of Patent: Jan. 30, 2024

(54) PIPELINE AUTOMATIC SCALE REMOVAL AND STORAGE DEVICE

(71) Applicants: Southwest Petroleum University, Chengdu (CN); Sichuan Xinchuangneng Petroleum Engineering Technology Co., Ltd., Guangyuan (CN); Sichuan Zhongtuo Youshi Light Control Technology Co., Ltd., Chengdu (CN)

(72) Inventors: Dezhi Zeng, Chengdu (CN); Miaopeng Zhou, Chengdu (CN); Jianqi Yang, Chengdu (CN); Qiang Du, Chengdu (CN); Dikui Cheng, Chengdu (CN); Baojun Dong, Chengdu (CN); Qiang Zhang, Chengdu (CN); Jiangjiang Zhang, Chengdu (CN); Gang Tian, Chengdu (CN)

(73) Assignees: Southwest Petroleum University, Chengdu (CN); Sichuan Xinchuangneng Petroleum Eng. Tech. Co Ltd, Guangyuan (CN); Sichuan Zhongtuo Youshi Light Control Tech. Co Ltd, Chengdu (CN)

( * ) Notice: Subject to any disclaimer, the term of this patent is extended or adjusted under 35 U.S.C. 154(b) by 0 days.

(21) Appl. No.: 18/304,034

(22) Filed: Apr. 20, 2023

(65) Prior Publication Data

US 2023/0356270 A1 Nov. 9, 2023

(30) Foreign Application Priority Data

May 7, 2022 (CN) .......................... 202210495074.1

(51) Int. Cl.
*B08B 9/04* (2006.01)
*B08B 1/00* (2006.01)
(Continued)

(52) U.S. Cl.
CPC ................ *B08B 9/04* (2013.01); *B08B 1/005* (2013.01); *F16L 55/26* (2013.01); *F16L 55/34* (2013.01)

(58) Field of Classification Search
CPC ..... B08B 9/0436; B08B 9/049; B08B 9/0492; B08B 9/053; B08B 9/0535; B08B 9/055;
(Continued)

(56) References Cited

U.S. PATENT DOCUMENTS 4,964,759 A * 10/1990 Guzzetta ................. F16L 55/26
405/303
6,339,993 B1 * 1/2002 Comello ................. F16L 55/28
73/866.5
(Continued)

OTHER PUBLICATIONS

CNIPA, Notification of a First Office Action for CN202210495074.1, dated Dec. 27, 2022.
(Continued)

*Primary Examiner* — Eric J Rosen
*Assistant Examiner* — Makena S Markman
(74) *Attorney, Agent, or Firm* — Zhigang Ma

(57) ABSTRACT

The present invention discloses a pipeline automatic scale removal and storage device. The device comprises a scale remover, a scale storage device and a coupling; the scale remover is composed of a scale breaking mechanism, a cutting mechanism and a grinding mechanism; a plurality of groups of scale breaking teeth of the scale breaking mechanism can preliminarily break scale on an inner wall of a pipeline; the cutting mechanism cuts and eliminates the scale on the inner wall of the pipeline through a plurality of installed cutting blades; and a plurality of groups of grinding blocks of the grinding mechanism further grind and eliminate the scale on the pipeline; and the scale storage device is used for realizing storage for the scale. The scale storage device is hermetically and movably installed in the pipeline.

(Continued)

The device of the present invention can automatically thoroughly eliminate the scale in the pipeline.

10 Claims, 16 Drawing Sheets

(51) Int. Cl.
*F16L 55/26* (2006.01)
*F16L 55/34* (2006.01)

(58) Field of Classification Search
CPC ...... B08B 9/0553; B08B 9/0557; F16L 55/26; F16L 55/34; F16L 55/28; F16L 55/38; F16L 55/36; F16L 55/44; F16L 2101/12
USPC .......... 15/104.31, 104.16, 104.061, 104.062, 15/104.063
See application file for complete search history.

(56) References Cited

U.S. PATENT DOCUMENTS

| | | | |
|---|---|---|---|
| 8,950,338 B2* | 2/2015 | Early | F16L 55/34 104/138.1 |
| 2012/0029702 A1* | 2/2012 | Tverlid | E21B 29/005 700/275 |
| 2018/0224015 A1 | 8/2018 | Enston | |
| 2021/0110856 A1 | 4/2021 | Kaveh et al. | |
| 2021/0312694 A1 | 10/2021 | Zhang et al. | |

OTHER PUBLICATIONS

CNIPA, Notification to grant patent right for invention in CN202210495074.1, dated Feb. 24, 2023.

* cited by examiner

PIPELINE AUTOMATIC SCALE REMOVAL AND STORAGE DEVICE

TECHNICAL FIELD

The present invention relates to the technical field of oil pipeline engineering, and particularly relates to a pipeline automatic scale removal and storage device.

BACKGROUND

With the increase of oilfield exploitation degree, the rise of water injection rate and the increase of comprehensive water cut of produced liquid, the problem of scale corrosion of oil and water wells has been disturbing the normal production of oilfields, and the problem of pipeline corrosion and scale caused by various reasons has become increasingly serious. The occurrence of the scaling phenomenon often causes corrosion damage to equipment and pipeline blockage, which reduces the efficiency of pipeline gathering and transportation, increases the production cost, and also sharply increases the energy consumption of transportation, causing that oil and gas cannot be normally transported or even not transported and bringing huge economic losses to oil and gas fields and downstream industries. At present, there are a large number of pipeline descaling devices, but most of descaling devices are difficult to conduct descaling operation at long distance due to a battery-driven device. In addition, in the descaling of natural gas and oil pipelines, there is a certain safety risk due to batteries installed in the device, so the device is not convenient to be widely promoted.

The invention patent CN 112847097 A discloses a pipeline descaling robot. The device comprises a front drive wheel assembly, a robot body frame, a grinding and descaling assembly and a rear support wheel assembly. A front drive wheel drives a robot to advance and retreat. The grinding and descaling assembly generates a rotating magnetic field through a descaling motor stator to drive the descaling motor rotor and a descaling throw block to rotate for grinding the inner wall surface of the pipeline to achieve a descaling effect. However, in the descaling process of the pipeline, due to long distance of the pipeline, the device relies on the batteries for providing power to descale the pipeline, and will not be operated for a long time. Thus, the device cannot be widely promoted.

The invention patent CN 112809533 B discloses a descaling device for oil and gas pipelines. The device comprises a shell, a driving cavity, a supporting cavity, a cleaning cavity and a supporting motor. Through the coordination of the supporting motor, a threaded shaft rod, a supporting rod, a supporting roller and a driving structure, the device can be operated in oil and gas pipelines with different diameters. Through the coordination between a cleaning motor and a cleaning mechanism, the device uses friction force to clean the inner wall of the pipeline. However, in the descaling process of the device, a motor is used for driving descaling, so the problem of electricity cannot be avoided in the descaling of the pipeline. Thus, the device is not suitable for use in the descaling operation of the pipeline.

The invention patent CN 112975755 A discloses a pipeline descaling device. The device comprises: a storage cavity, a storage adapter, a rotating shaft, a bearing sleeve, a sprinkler joint, a sprinkler and a nozzle. The device mainly sprays a mixed aqueous solution to the sediment on the surface of the pipeline through the nozzle. Because the mixed aqueous solution contains abrasive, the abrasive can greatly enhance the stripping ability of the mixed aqueous solution on the sediment on the surface of the pipeline and improve the cleaning effect for the sediment on the surface of the pipeline. However, the device needs to be connected with high pressure liquid during use, and thus cannot conduct descaling operation in the pipeline.

Therefore, how to overcome low descaling efficiency or even impossibility of completing descaling operation caused by limited battery power in long-distance pipeline descaling becomes an urgent problem for practitioners in the industry.

SUMMARY

In view of this, the present invention proposes a pipeline automatic scale removal and storage device, which has the following specific technical solution:

A pipeline automatic scale removal and storage device is provided. The scale removal and storage device is installed in a pipeline and comprises: a scale remover, a scale storage device and a coupling; and the scale remover is connected with the scale storage device through the coupling.

The scale remover is composed of a scale breaking mechanism, a cutting mechanism and a grinding mechanism;

The scale breaking mechanism comprises a first central shaft, a supporting skeleton, a triangular disk and scale breaking teeth; the first central shaft is fixed at the center of the supporting skeleton, and the first central shaft is perpendicular to a plane in which the supporting skeleton is located; a plurality of base round sleeves are uniformly distributed along a circumferential direction outside the supporting skeleton; the base round sleeves are connected with telescopic mechanisms; one end of each telescopic mechanism is located in the base round sleeves, and the other end is fixed with the triangular disk; a plurality of scale breaking teeth are arranged at one side of the triangular disk near an inner wall of the pipeline; and an outward triangular end of the triangular disk is taken as a front end, and the front end and the rear end of the triangular disk are respectively provided with a plurality of directional wheels.

The cutting mechanism comprises a second central shaft, a cutting mechanism skeleton, fixing disks and cutting blades; a body of the cutting mechanism skeleton is a supporting sheath; a plurality of base round sleeves are uniformly distributed around both ends of an outer peripheral surface of the supporting sheath; a bearing positioning bulge is arranged inside the supporting sheath; a ball bearing is placed respectively at both ends of the bearing positioning bulge, and the second central shaft is sleeved in the ball bearings; the second central shaft penetrates through the bearing positioning bulge, and the outer wall is in clearance fit with the inner wall of the bearing positioning bulge; the outer peripheral surface of the second central shaft is provided with an external thread and a circlip groove, and a pin through hole is formed at the corresponding external thread; a circlip is placed in the circlip groove, and the circlip limits the axial movement of the ball bearings on the second central shaft; the external thread is connected with a slotted lock nut, the slotted lock nut is located in the supporting sheath and the outer sides of the ball bearings, and a pin is inserted into a groove of the slotted lock nut; the pin penetrates through the slotted lock nut and is inserted into the pin through hole to limit the rotation of the slotted lock nut; the base round sleeves on the outer peripheral surface of the supporting sheath are connected with the telescopic mechanisms; one end of the plurality of telescopic mechanisms corresponds one by one to the plurality of base round sleeves located on one side of the supporting sheath, and the other end is correspondingly connected with the fixing disks; a plurality of fixing disks are arranged, and the quantity is consistent with the quantity of the base round sleeves on the corresponding side of the supporting sheath; a cutting edge fixing groove is arranged outside each fixing disk; a plurality of threaded through holes are formed on both sides of the cutting edge fixing grooves, and the cutting blades are integrally installed in the middle; the cutting blades are fixed with the cutting edge fixing grooves through studs; one end of the plurality of telescopic mechanisms corresponds one by one to a plurality of base round sleeves located on the other side of the supporting sheath, and the other end is correspondingly connected with steering wheels.

The grinding mechanism comprises a third central shaft, a grinding mechanism skeleton, a fixing bottom plate and grinding blocks; the third central shaft is fixed at the center of the grinding mechanism skeleton, and the third central shaft is perpendicular to a plane in which the grinding mechanism skeleton is located; both ends of the third central shaft are respectively a threaded connector D and a threaded connector E; the threaded connector E is connected with a female adapter at one end of the second central shaft; a female adapter at the other end of the second central shaft is connected with a threaded connector F at the end of the first central shaft; a plurality of base round sleeves are uniformly distributed along a circumferential direction outside the grinding mechanism skeleton; the base round sleeves are connected with the telescopic mechanisms; one end of the telescopic mechanisms is located in the base round sleeves, and the other end is connected with the fixing bottom plate; the grinding blocks are installed on one side of the fixing bottom plate near the inner wall of the pipeline, and the grinding blocks are in clearance fit with the inner wall of the pipeline; and a plurality of directional wheels are installed at one end adjacent to the installing positions of the grinding blocks on the fixing bottom plate.

One end of the coupling is connected with the threaded connector D in the scale remover, and the other end is connected with a coupling connector at the end of the scale storage device.

The scale storage device is hermetically and movably installed in the pipeline, and the scale removal and storage device moves forward as a whole under the pressure action of rear fluid to realize automatic scale removal and storage.

Compared with the prior art, the present invention discloses a pipeline automatic scale removal and storage device, which has the following advantages:

(1) The scale removal and storage device disclosed by the present invention is placed as a whole in the pipeline. Under the pressure action of the rear fluid, the device moves forward as a whole to avoid inability to operate for a long time due to the use of batteries.

(2) The scale remover disclosed by the present invention can realize the automatic and thorough removal of the scale on the inner wall of the pipeline by utilizing the scale breaking mechanism, the cutting mechanism and the grinding mechanism to avoid inability to complete pipeline removal operation by an ordinary pipeline remover due to serious scaling.

(3) The scale breaking mechanism, the cutting mechanism and the grinding mechanism disclosed by the present invention are all provided with the telescopic mechanisms to ensure free expansion and contraction of the scale breaking teeth, the cutting blades and the grinding blocks to avoid the damage to the inner wall of the pipeline by hard contact.

(4) The device of the present invention can automatically thoroughly eliminate the scale in the pipeline, and realize the storage for the scale, which is convenient for later experimental analysis, and the device has simple structure and convenient operation.

Preferably, the scale storage device is a barrel with a hollow interior; one end of the barrel is sealed, and the other end is connected with an end cover through a stud; leather bowls are arranged at the peripheries of both ends of the barrel; the leather bowls are connected with the barrel through the studs, and the leather bowls are attached to the inner wall of the pipeline to form seal; a guide cylinder is vertically and fixedly installed at the center of the end cover; a spiral rotating shaft penetrates into the guide cylinder; one end of the guide cylinder extending into the barrel is connected with a rotating shaft supporting frame through a stud, and one end of the rotating shaft supporting frame away from the guide cylinder is fixedly connected with a bracket base; a threaded connector A is arranged at the center of the bracket base toward the direction of the guide cylinder; a compaction thread bushing A is connected and sleeved outside the threaded connector A; two groups of thrust bearings are arranged in the compaction thread bushing A; a supporting rotating shaft is clamped between the two groups of thrust bearings; the supporting rotating shaft and the spiral rotating shaft are connected and rotated synchronously, and a spiral blade is installed around the spiral rotating shaft; one end of the guide cylinder away from the rotating shaft supporting frame is provided with a threaded connector B, and a compaction thread bushing B is connected and sleeved outside the threaded connector B; two groups of thrust bearings are also arranged in the compaction thread bushing B; a rotating shaft ring outside one end of a fan blade rotating shaft is clamped between the two groups of thrust bearings; one end of the spiral rotating shaft away from the supporting rotating shaft is connected with the fan blade rotating shaft and rotates synchronously; the fan blade rotating shaft is provided with fan blades; one end of the fan blade rotating shaft away from the spiral rotating shaft is connected with a composite rotating shaft and rotates synchronously; the composite rotating shaft is provided with the fan blades and the spiral blade; an outer ring of one end of the fan blade rotating shaft connected with the composite rotating shaft is encircled with two semicircular supporting rings; the semicircular supporting rings are fixedly encircled at the corresponding ends of the fan blade rotating shaft and the composite rotating shaft through studs, and the fan blade rotating shaft and the composite rotating shaft are connected; the spiral blade at one end of the composite rotating shaft away from the fan blade rotating shaft is located inside a threaded connector C of a first connecting frame in the coupling; the rotating shaft ring outside the composite rotating shaft is clamped between the two groups of thrust bearings; and the threaded connector C of the first connecting frame is connected with a compaction thread bushing C to compact the thrust bearings corresponding to the composite rotating shaft.

The body of the scale storage device disclosed by the present invention is a hollow barrel; and one end of the scale storage device can automatically collect the scale in the pipeline into the barrel by using the rotation of the composite rotating shaft, the fan blade rotating shaft and the spiral rotating shaft, so as to provide scale samples for later experimental analysis.

Preferably, the spiral rotating shaft is composed of a spiral blade and a mandrel; the spiral blade is fixed around the mandrel, and both ends of the mandrel are provided with mandrel bumps; one end of the supporting rotating shaft is matched with the mandrel bump at the corresponding end of the mandrel through a groove to realize the synchronous rotation of the supporting rotating shaft and the spiral rotating shaft; one end of the spiral rotating shaft away from the supporting rotating shaft is matched with a mandrel groove at the end of the fan blade rotating shaft through the mandrel bumps to realize the synchronous rotation of the spiral rotating shaft and the fan blade rotating shaft; and the outer edge of the spiral blade on the spiral rotating shaft is in clearance fit with the inner wall of the guide cylinder.

Preferably, the fan blade rotating shaft comprises a rotating shaft barrel, a rotating shaft ring, the mandrel and the fan blades; one end of the mandrel is provided with the mandrel groove, and the other end is provided with the mandrel bumps; the fan blades are divided into two groups uniformly distributed at both ends of the mandrel along the circumferential direction and fixedly connected with the inner wall of the rotating shaft barrel sleeved outside the mandrel; and the rotating shaft ring is fixedly installed at the periphery of the end of the rotating shaft barrel.

Preferably, the composite rotating shaft comprises the rotating shaft barrel, the rotating shaft ring, the mandrel, the fan blades and the spiral blade; the fan blades are fixedly connected with the inner wall of the rotating shaft barrel; the rotating shaft ring is fixedly installed at the periphery of the end of the rotating shaft barrel; a part of the mandrel is located in the rotating shaft barrel and is fixed with one end of the fan blades away from the inner wall of the rotating shaft barrel, and the other part is fixed around the spiral blade; and the outer edge of the spiral blade is in clearance fit with the inner wall of the threaded connector C of the first connecting frame.

Preferably, outer sides of one end of the fan blade rotating shaft and the rotating shaft barrel on the composite rotating shaft away from the corresponding rotating shaft ring are provided with annular grooves; the inner walls of the semicircular supporting rings are provided with two groups of bulges, which can be matched with the annular grooves on the fan blade rotating shaft and the composite rotating shaft respectively; the outer sides of the semicircular supporting rings are provided with the base round sleeves; the base round sleeves are connected with the telescopic mechanisms; one end of the telescopic mechanisms is located in the base round sleeves, and the other end is connected with the steering wheels.

Preferably, the coupling is composed of the first connecting frame, the threaded connector C, a cross ring and a second connecting frame; the cross ring is respectively connected with the first connecting frame and the second connecting frame, and is fixed by a pin; and the coupling is connected with the coupling connector at the end of the scale storage device through the threaded connector C fixed outside the first connecting frame, and is connected with the threaded connector D in the scale remover through an internal threaded pipe fixed outside the second connecting frame.

Preferably, each telescopic mechanism is composed of a square supporting rod, a square sleeve, a rotating cylinder, a spring and a positioning stud; the rotating cylinder is located in the corresponding base round sleeve; a plurality of positioning screw holes are uniformly and correspondingly distributed at the periphery of the rotating cylinder and the base round sleeve; the positioning screw holes and the positioning studs are matched to limit the rotation of the rotating cylinder relative to the base round sleeve; the upper part of the rotating cylinder is fixed with the square sleeve; the spring is arranged in the square sleeve; one end of the square supporting rod is located in the square sleeve and abutted against the spring, and the other end is connected with the corresponding structure; and the square supporting rod expands and contracts in the square sleeve under the action of external force.

Preferably, an angle between the cutting blades and a horizontal direction is less than or equal to 45 degrees; and the arc length of a contact point between the two adjacent cutting blades and the inner wall of the pipeline is less than or equal to the length of the cutting blades.

Preferably, a plurality of ribbed plates are uniformly distributed outside the first central shaft and the third central shaft respectively along the circumferential directions.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

Figure 1:
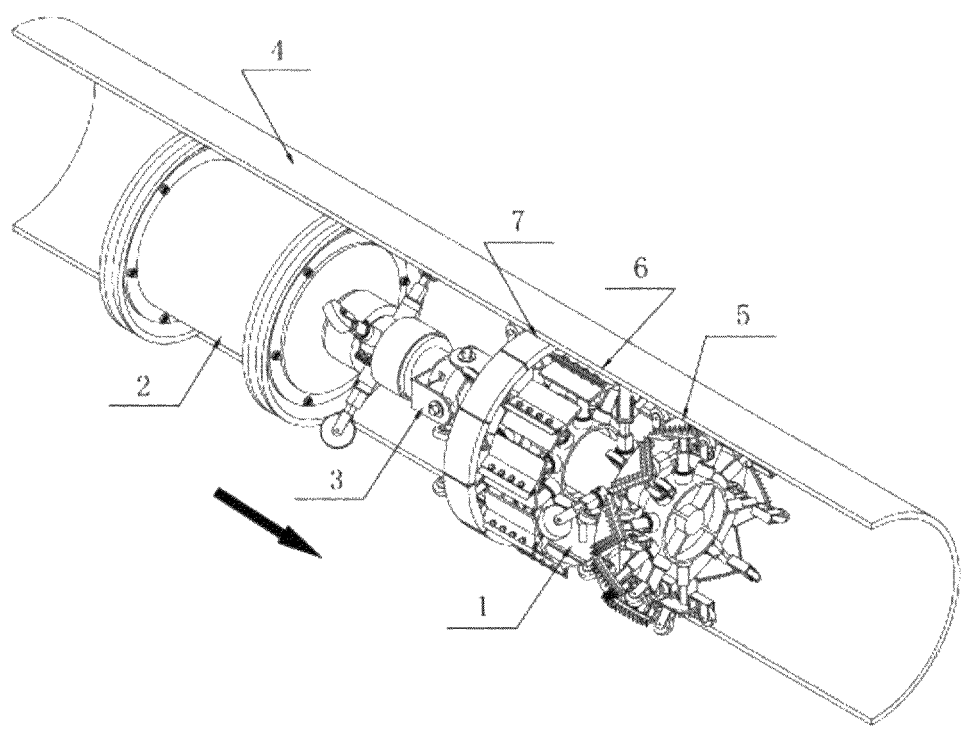
FIG. 1 is an arrangement schematic diagram of a pipeline automatic scale removal and storage device provided by an embodiment of the present invention in a pipeline.

In the figures: 1-scale remover; 2-scale storage device; 3-coupling; 4-pipeline; 5-scale breaking mechanism; 6-cutting mechanism; 7-grinding mechanism; 8-supporting skeleton; 9-directional wheel; 10-triangular disk; 11-scale breaking tooth; 12-first central shaft; 13-ribbed plate; 14-base round sleeve; 15-second central shaft; 16-cutting mechanism skeleton; 17-steering wheel; 18-fixing disk; 19-supporting sheath; 20-bearing positioning bulge; 21-ball bearing; 22-external thread; 23-circlip groove; 24-pin through hole; 25-circlip; 26-slotted lock nut; 27-pin; 28-cutting edge fixing groove; 29-cutting blade; 30-grinding mechanism skeleton; 31-fixing bottom plate; 32-grinding block; 33-third central shaft; 34-threaded connector D; connector E; 36-telescopic mechanism; 37-square supporting rod; 38-square sleeve; 39-rotating cylinder; 40-spring; 41-positioning stud; 42-positioning screw hole; 43-barrel; 44-end cover; 45-leather bowl; 46-guide cylinder; 47-spiral rotating shaft; 48-rotating shaft supporting frame; 49-bracket base; 50-threaded connector A; 51-compaction thread bushing A; 52-thrust bearing; 53-supporting rotating shaft; 54-mandrel bump; 55-threaded connector B; 56-compaction thread bushing B; 57-fan blade rotating shaft; 58-semicircular supporting ring; 59-composite rotating shaft; 60-spiral blade; 61-first connecting frame; 62-threaded connector C; 63-rotating shaft ring; 64-compaction thread bushing C; 65-cross ring; 66-second connecting frame; 67-internal threaded pipe; 68-mandrel; 69-rotating shaft barrel; blade; 71-annular groove; 72-mandrel groove.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

It should be understood in the description of the present invention that terms such as "upper", "lower", "front", "rear", "left", "right", "top", "bottom", "inner", "outer", etc. indicate direction or position relationships shown based on the drawings, and are only intended to facilitate the description of the present invention and the simplification of the description rather than to indicate or imply that the indicated device or element must have a specific direction or constructed and operated in a specific direction, and therefore, shall not be understood as a limitation to the present invention.

Embodiments

As shown in FIG. 1-FIG. 14, a pipeline automatic scale removal and storage device provided by the present invention comprises: a scale remover 1, a scale storage device 2 and a coupling 3; and the scale remover 1 is connected with the scale storage device 2 through the coupling 3.

As shown in FIG. 1, the scale removal and storage device is installed inside a pipeline 4. A direction indicated by an arrow in FIG. 1 is the motion direction of the device.

Figure 2:
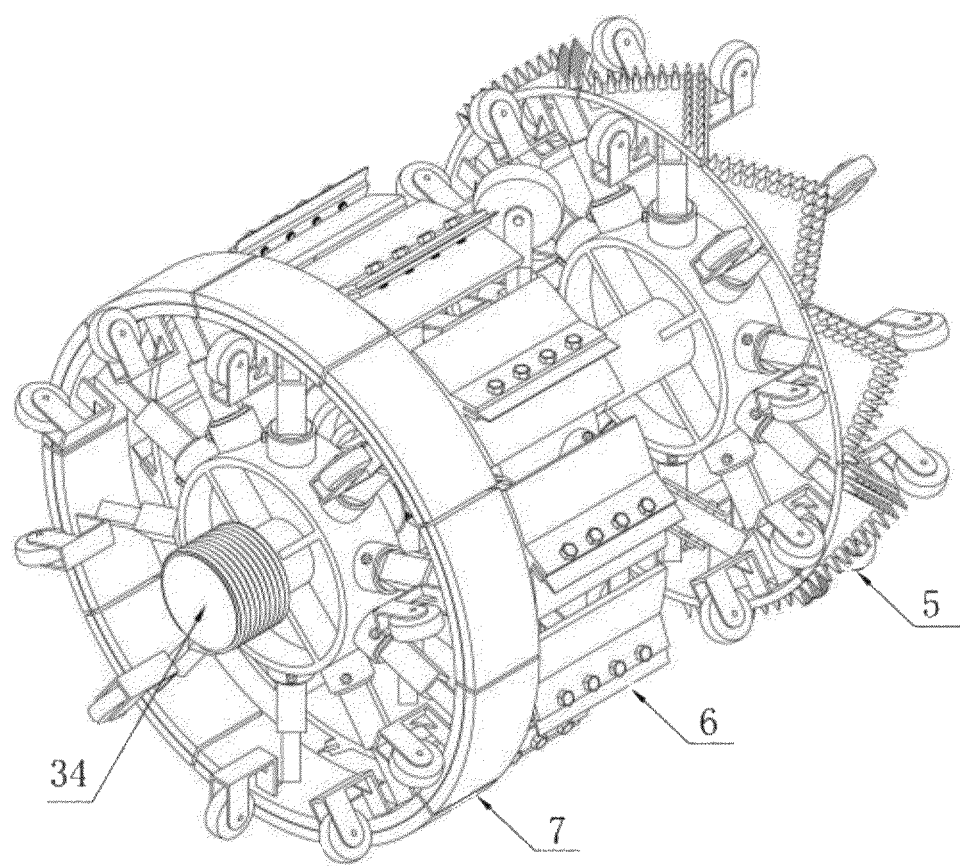
FIG. 2 is an isometric schematic diagram of a scale remover provided by an embodiment of the present invention.

Wherein:

As shown in FIG. 2, the scale remover is composed of a scale breaking mechanism a cutting mechanism 6 and a grinding mechanism 7.

Figure 3:
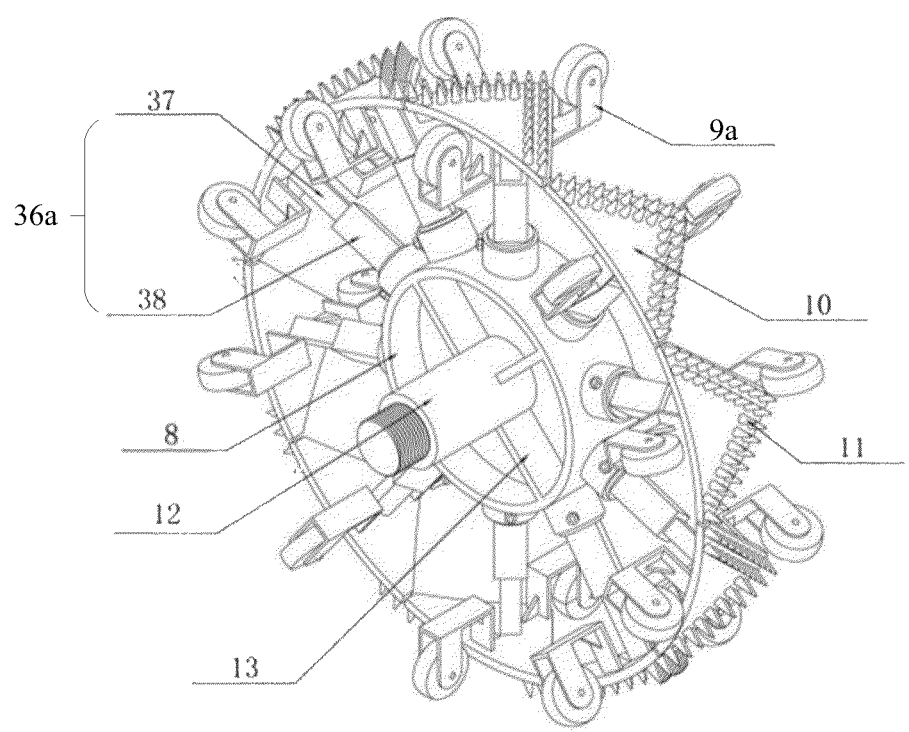
FIG. 3 is an isometric schematic diagram of a scale breaking mechanism provided by an embodiment of the present invention.
Figure 4:
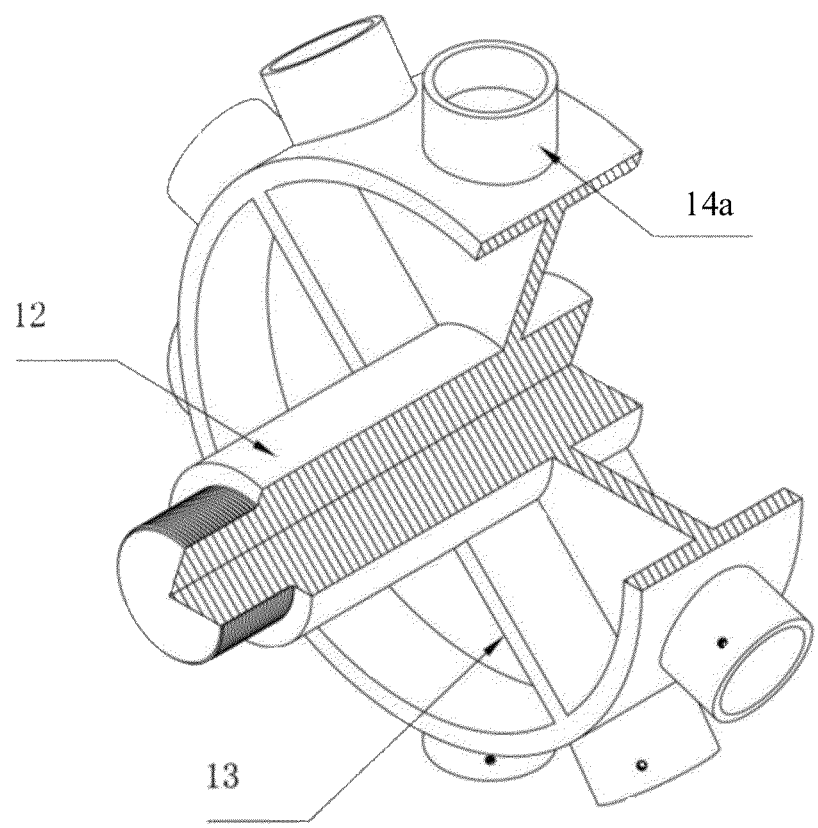
FIG. 4 is an isometric schematic diagram of a local sectional view of a supporting skeleton provided by an embodiment of the present invention.

As shown in FIG. 3 and FIG. 4, the scale breaking mechanism 5 comprises a first central shaft 12, a supporting skeleton 8, a triangular disk 10 and scale breaking teeth 11; the first central shaft 12 is fixed at the center of the supporting skeleton 8, and the first central shaft 12 is perpendicular to a plane in which the supporting skeleton 8 is located; a plurality of first base round sleeves 14a are uniformly distributed along a circumferential direction outside the supporting skeleton 8; the first base round sleeves 14a are connected with first telescopic mechanisms 36a; one end of each first telescopic mechanism 36a is located in each of the first base round sleeves 14a, and the other end is fixed with one of the triangular disks 10; part of the plurality of scale breaking teeth 11 are arranged at one side of each triangular disk 10 near an inner wall of the pipeline 4; and an outward triangular end of the triangular disk 10 is taken as a front end, and the front end and the rear end of the triangular disk 10 are respectively provided with a plurality of first directional wheels 9a.

Figure 5:
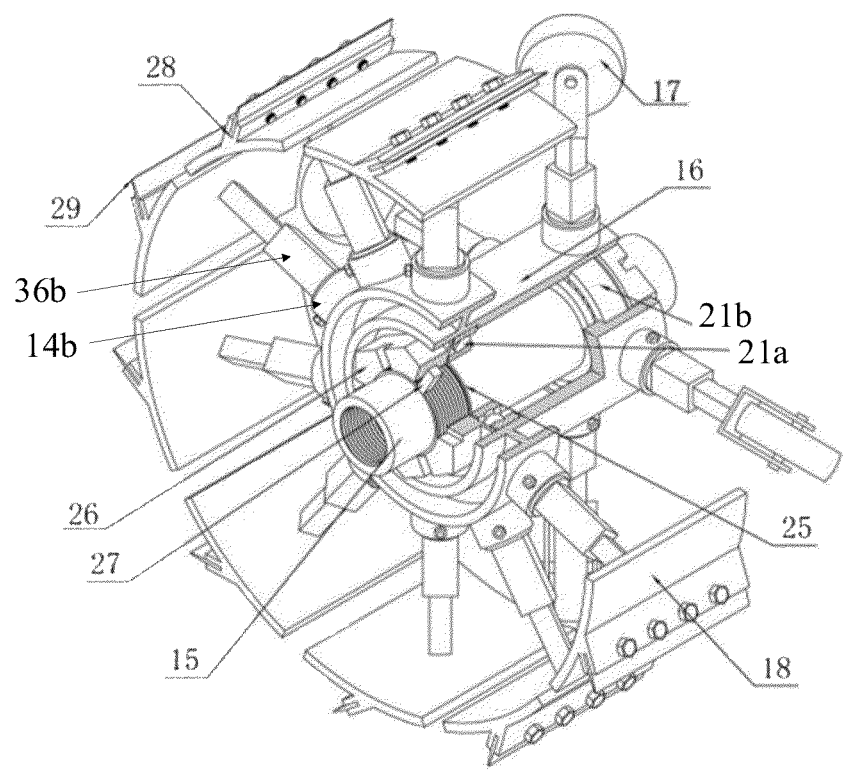
FIG. 5 is an isometric schematic diagram of a local sectional view of a cutting mechanism provided by an embodiment of the present invention.
Figure 6:
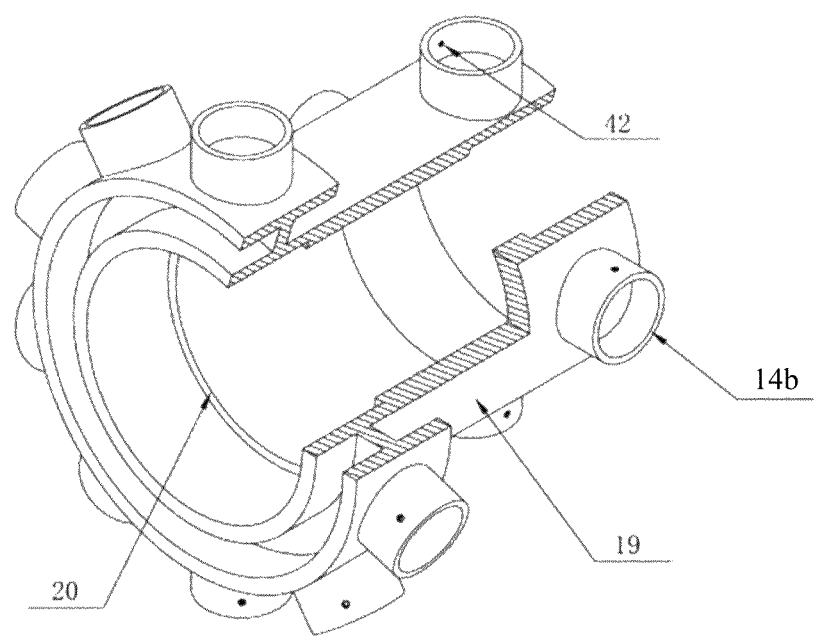
FIG. 6 is an isometric schematic diagram of a local sectional view of a cutting mechanism skeleton provided by an embodiment of the present invention.
Figure 7:
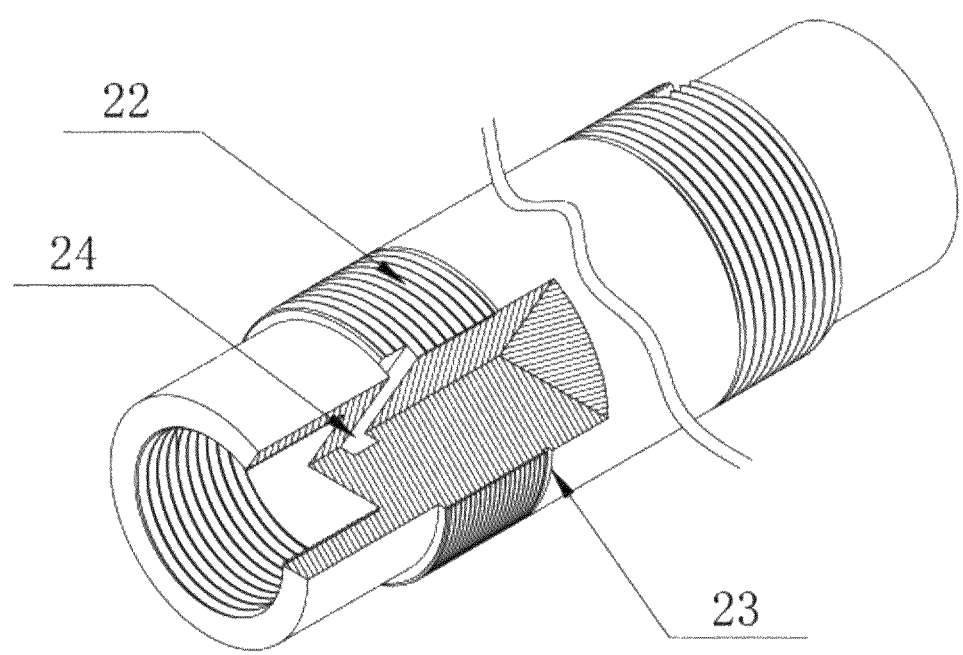
FIG. 7 is an isometric schematic diagram of a local sectional view of a second central shaft provided by an embodiment of the present invention.

As shown in FIGS. 5-7, the cutting mechanism 6 comprises a second central shaft 15, a cutting mechanism skeleton 16, fixing disks 18 and cutting blades 29; a body of the cutting mechanism skeleton 16 is a supporting sheath 19; a plurality of second base round sleeves 14b are uniformly distributed around both ends of an outer peripheral surface of the supporting sheath 19; a bearing positioning bulge 20 is arranged inside the supporting sheath 19; a first ball bearing 21a is placed respectively at a first end of the bearing positioning bulge 20 and a second ball bearing 21b is placed at an opposite second end of the bearing positioning bulge and the second central shaft 15 is sleeved in the first and second ball bearings 21a and 21b; the second central shaft 15 penetrates through the bearing positioning bulge 20, and the outer wall is in clearance fit with the inner wall of the bearing positioning bulge 20; the outer peripheral surface of the second central shaft 15 is provided with an external thread 22 and a circlip groove 23, and a pin through hole 24 is formed at the corresponding external thread 22; a circlip 25 is placed in the circlip groove 23, and the circlip limits the axial movement of the first ball bearings 21a on the second central shaft 15; the external thread 22 is connected with a slotted lock nut 26, the slotted lock nut 26 is located in the supporting sheath 19 and the outer sides of the first ball bearings 21a, and a pin 27 is inserted into a groove of the slotted lock nut 26; the pin 27 penetrates through the slotted lock nut 26 and is inserted into the pin through hole 24 to limit the rotation of the slotted lock nut 26; the second base round sleeves 14b on the outer peripheral surface of the supporting sheath 19 are connected with a plurality of second telescopic mechanisms 36b; one end of each of the plurality of second telescopic mechanisms 36b corresponds one by one to the plurality of second base round sleeves 14b located on one side of the supporting sheath 19, and the other end is correspondingly connected with the fixing disks 18; a plurality of fixing disks 18 are arranged, and the quantity is consistent with the quantity of the second base round sleeves 14b on the corresponding side of the supporting sheath 19; a cutting edge fixing groove 28 is arranged outside each fixing disk 18; a plurality of threaded through holes are formed on both sides of the cutting edge fixing grooves 28, and the cutting blades 29 are integrally installed in the middle; the cutting blades 29 are fixed with the cutting edge fixing grooves 28 through studs; one end of the plurality of second telescopic mechanisms 36b corresponds one by one to the plurality of second base round sleeves 14b located on the other side of the supporting sheath 19, and the other end is correspondingly connected with steering wheels 17.

Figure 8:
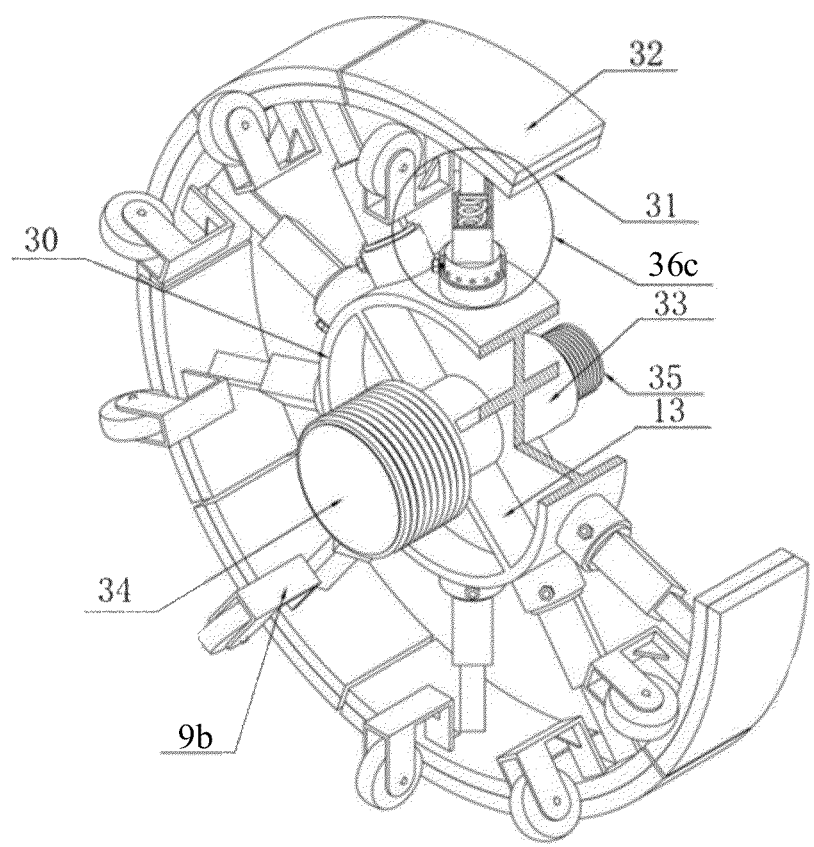
FIG. 8 is an isometric schematic diagram of a local sectional view of a grinding mechanism provided by an embodiment of the present invention.
Figure 9:
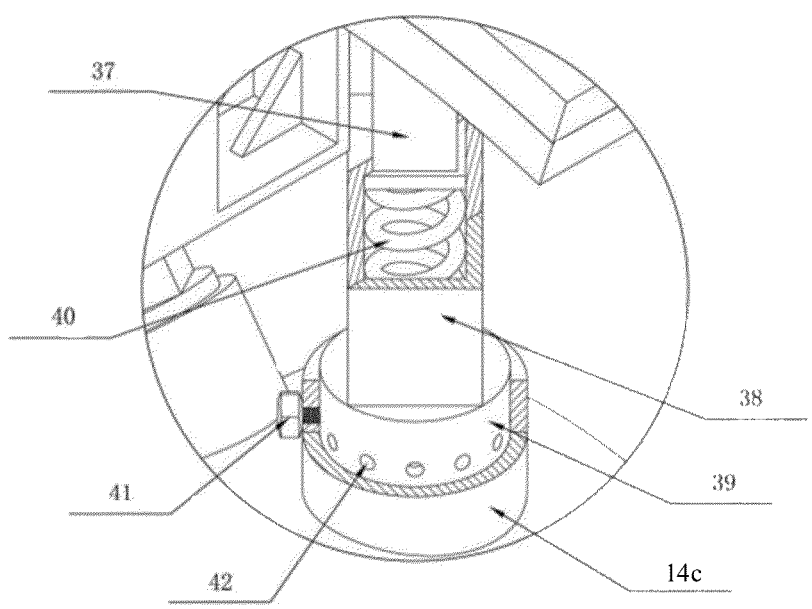
FIG. 9 is an isometric schematic diagram of a local sectional view of a telescopic mechanism provided by an embodiment of the present invention.

As shown in FIG. 8 and FIG. 9, the grinding mechanism 7 comprises a third central shaft 33, a grinding mechanism skeleton 30, a fixing bottom plate 31 and grinding blocks 32; the third central shaft 33 is fixed at the center of the grinding mechanism skeleton 30, and the third central shaft 33 is perpendicular to a plane in which the grinding mechanism skeleton 30 is located; both ends of the third central shaft 33 are respectively a threaded connector D34 and a threaded connector E35; the threaded connector E35 is connected with a female adapter at one end of the second central shaft 15; a female adapter at the other end of the second central shaft 15 is connected with a threaded connector F at the end of the first central shaft 12; a plurality of third base round sleeves 14c are uniformly distributed along a circumferential direction outside the grinding mechanism skeleton 30; the third base round sleeves 14c are connected with third telescopic mechanisms 36c; one end of each of the third telescopic mechanisms 36c is located in a corresponding one of the third base round sleeves 14c, and the other end is connected with the fixing bottom plate 31; the grinding blocks 32 are installed on one side of the fixing bottom plate 31 near the inner wall of the pipeline 4, and the grinding blocks 32 are in clearance fit with the inner wall of the pipeline 4; and a plurality of second directional wheels 9b are installed at one end adjacent to the installing positions of the grinding blocks 32 on the fixing bottom plate 31.

One end of the coupling 3 is connected with the threaded connector D34 in the scale remover 1, and the other end is connected with a coupling connector at the end of the scale storage device 2.

The scale storage device 2 is hermetically and movably installed in the pipeline 4, and the scale removal and storage device moves forward as a whole under the pressure action of rear fluid to realize automatic scale removal and storage.

In the present invention, a plurality of groups of scale breaking teeth 11 of the scale breaking mechanism 5 can preliminarily break scale on the inner wall of the pipeline; the cutting mechanism 6 cuts and eliminates the scale on the inner wall of the pipeline through a plurality of installed cutting blades 29; and a plurality of groups of grinding blocks 32 of the grinding mechanism 7 further grind and eliminate the scale on the pipeline.

Further, as shown in FIG. 3, when the device passes through the bend of the pipeline, the directional wheels 9 can contact the inner wall of the pipeline 4 to contract the telescopic mechanisms 36, so as to avoid damage to the inner wall of the pipeline 4 by the grinding blocks 32 or the scale breaking teeth 11.

Further, a plurality of ribbed plates 13 are uniformly distributed outside the first central shaft 12 and the third central shaft 33 respectively along the circumferential directions to enhance stiffness.

As shown in FIGS. 10-14, the scale storage device 2 is a barrel 43 with a hollow interior; one end of the barrel 43 is sealed, and the other end is connected with an end cover 44 through a stud; leather bowls 45 are arranged at the peripheries of both ends of the barrel 43; the leather bowls 45 are connected with the barrel 43 through the studs, and the leather bowls 45 are attached to the inner wall of the pipeline 4 to form seal; a guide cylinder 46 is vertically and fixedly installed at the center of the end cover 44; a spiral rotating shaft 47 penetrates into the guide cylinder 46; one end of the guide cylinder 46 extending into the barrel 43 is connected with a rotating shaft supporting frame 48 through a stud, and one end of the rotating shaft supporting frame 48 away from the guide cylinder 46 is fixedly connected with a bracket base 49; a threaded connector A50 is arranged at the center of the bracket base 49 toward the direction of the guide cylinder 46; a compaction thread bushing A51 is connected and sleeved outside the threaded connector A50; two groups of first thrust bearings 52a are arranged in the compaction thread bushing A51; a supporting rotating shaft 53 is clamped between the two groups of first thrust bearings 52a; the supporting rotating shaft 53 and the spiral rotating shaft 47 are connected and rotated synchronously, and a spiral blade 60 is installed around the spiral rotating shaft 47; one end of the guide cylinder 46 away from the rotating shaft supporting frame 48 is provided with a threaded connector B55, and a compaction thread bushing B56 is connected and sleeved outside the threaded connector B55; two groups of second thrust bearings 52b are also arranged in the compaction thread bushing B56; a rotating shaft ring 63 outside one end of a fan blade rotating shaft 57 is clamped between the two groups of second thrust bearings 52b; one end of the spiral rotating shaft 47 away from the supporting rotating shaft 53 is connected with the fan blade rotating shaft 57 and rotates synchronously; the fan blade rotating shaft 57 is provided with fan blades 70; one end of the fan blade rotating shaft 57 away from the spiral rotating shaft 47 is connected with a composite rotating shaft 59 and rotates synchronously; the composite rotating shaft 59 is provided with the fan blades 70 and the spiral blade 60; an outer ring of one end of the fan blade rotating shaft 57 connected with the composite rotating shaft 59 is encircled with two semicircular supporting rings 58; the semicircular supporting rings 58 are fixedly encircled at the corresponding ends of the fan blade rotating shaft 57 and the composite rotating shaft 59 through studs, and the fan blade rotating shaft 57 and the composite rotating shaft 59 are connected; the spiral blade 60 at one end of the composite rotating shaft 59 away from the fan blade rotating shaft 57 is located inside a threaded connector C62 of a first connecting frame 61 in the coupling 3; the rotating shaft ring 63 outside the composite rotating shaft 59 is clamped between the two groups of third thrust bearings 52c; and the threaded connector C62 of the first connecting frame 61 is connected with a compaction thread bushing C64 to compact the third thrust bearings 52c corresponding to the composite rotating shaft 59.

The body of the scale storage device is a barrel with a hollow interior. The composite rotating shaft, the fan blade rotating shaft and the spiral rotating shaft installed on the scale storage device rotate as a whole through connection, so that the cleaned scale in the pipeline enters the barrel of the scale storage device under the drive of the spiral blade and the fan blades, so as to realize the storage for the scale.

Figure 12:
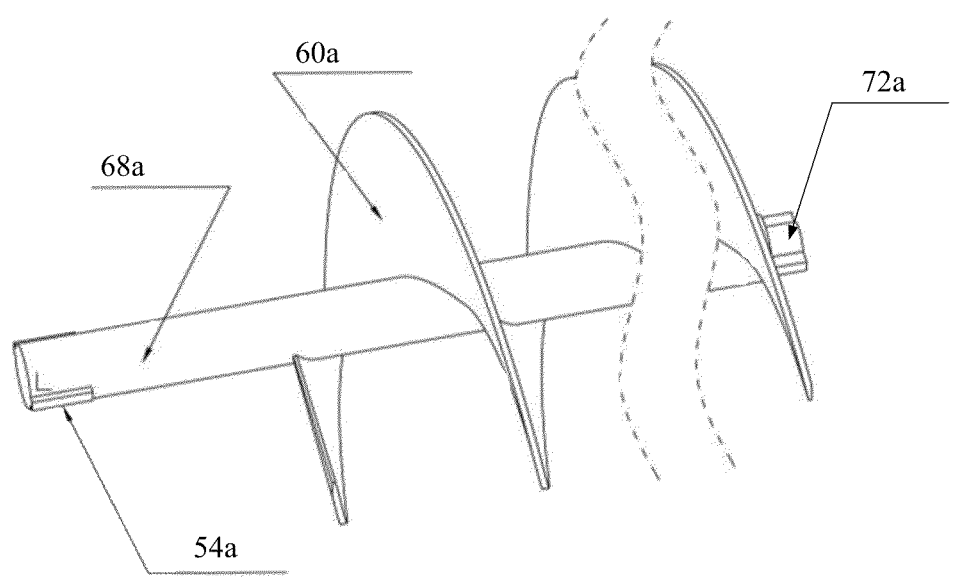
FIG. 12 is an isometric schematic diagram of a spiral rotating shaft provided by an embodiment of the present invention.

Further, as shown in FIG. 12, the spiral rotating shaft 47 is composed of a first spiral blade 60a and a first mandrel 68a; the first spiral blade 60a is fixed around the first mandrel 68a, and both ends of the first mandrel 68a are provided with first mandrel bumps 54a; one end of the supporting rotating shaft 53 is matched with the first mandrel bump 54a at the corresponding end of the first mandrel 68a through a groove to realize the synchronous rotation of the supporting rotating shaft 53 and the spiral rotating shaft 47; one end of the spiral rotating shaft 47 away from the supporting rotating shaft 53 is matched with a first mandrel groove 72a at the end of the fan blade rotating shaft 57 through the first mandrel bumps 54a to realize the synchronous rotation of the spiral rotating shaft 47 and the fan blade rotating shaft 57; and the outer edge of the first spiral blade 60a on the spiral rotating shaft 47 is in clearance fit with the inner wall of the guide cylinder 46.

Figure 13:
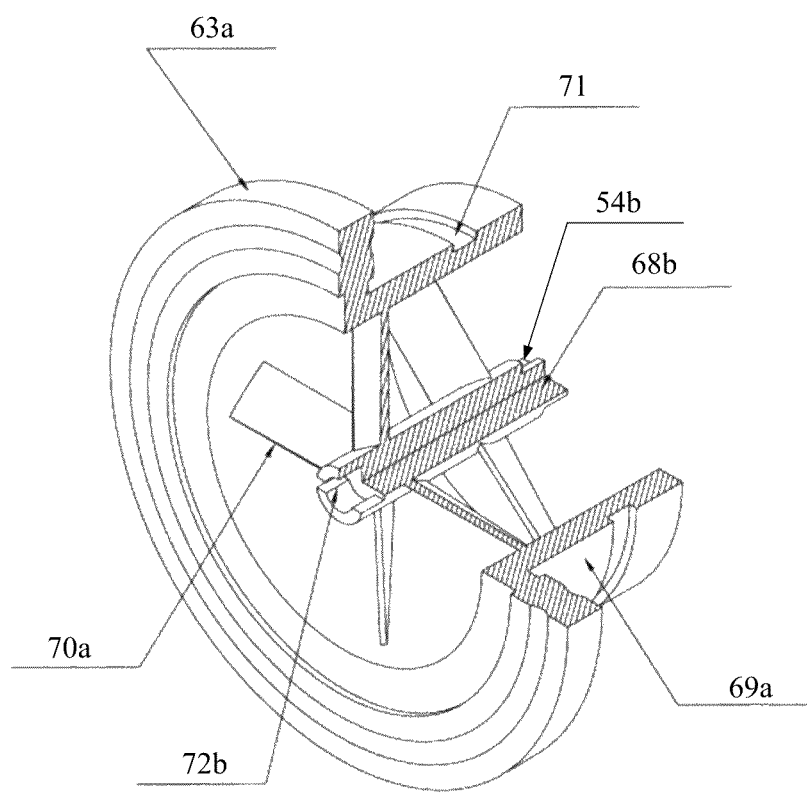
FIG. 13 is an isometric schematic diagram of a local sectional view of a fan blade rotating shaft provided by an embodiment of the present invention.

Further, as shown in FIG. 13, the fan blade rotating shaft 57 comprises a first rotating shaft barrel 69a, a first rotating shaft ring 63a, the second mandrel 68a and the first fan blades 70a; one end of the second mandrel 68b is provided with a second mandrel groove 72b, and the other end is provided with the second mandrel bumps 54b; the first fan blades 70a are divided into two groups uniformly distributed at both ends of the second mandrel 68b along the circumferential direction and fixedly connected with the inner wall of the first rotating shaft barrel 69a sleeved outside the second mandrel 68b; and the first rotating shaft ring 63a is fixedly installed at the periphery of the end of the first rotating shaft barrel 69a.

Figure 14:
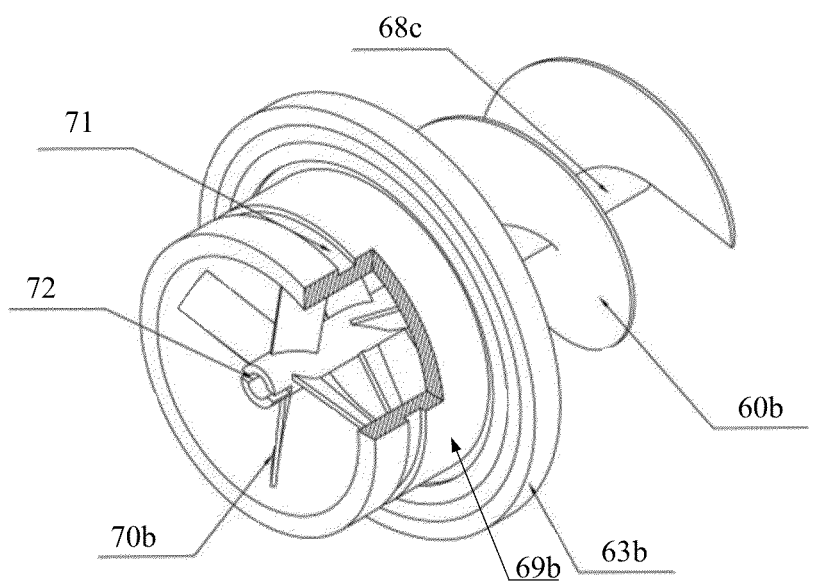
FIG. 14 is an isometric schematic diagram of a local sectional view of a composite rotating shaft provided by an embodiment of the present invention.

Further, as shown in FIG. 14, the composite rotating shaft 59 comprises a second rotating shaft barrel 69b, a second rotating shaft ring 63b, a third mandrel 68c, second fan blades 70b and the second spiral blade 60b; the second fan blades 70b are fixedly connected with the inner wall of the second rotating shaft barrel 69b; and the second rotating shaft ring 63b is fixedly installed at the periphery of the end of the rotating shaft barrel. A part of the third mandrel 68c is located in the second rotating shaft barrel 69b and is fixed with one end of the second fan blades 70b away from the inner wall of the second rotating shaft barrel 69b, and the other part is fixed around the second spiral blade 60b; and the outer edge of the second spiral blade 60b is in clearance fit with the inner wall of the threaded connector C62 of the first connecting frame 61.

Figure 10:
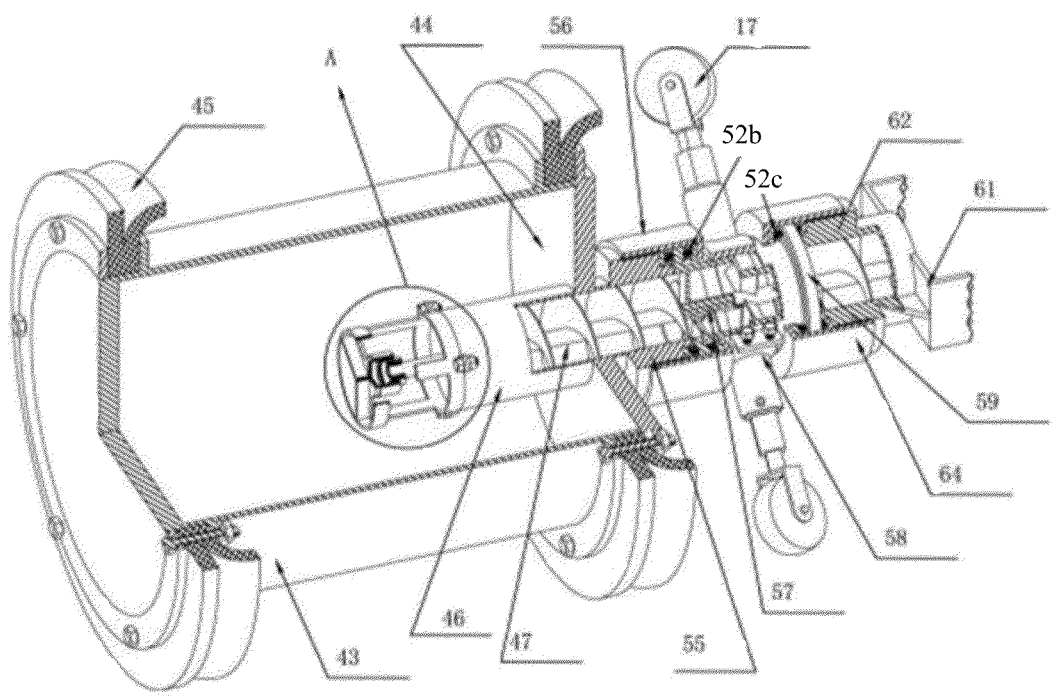
FIG. 10 is an isometric schematic diagram of a local sectional view of a scale storage device provided by an embodiment of the present invention.
Figure 11:
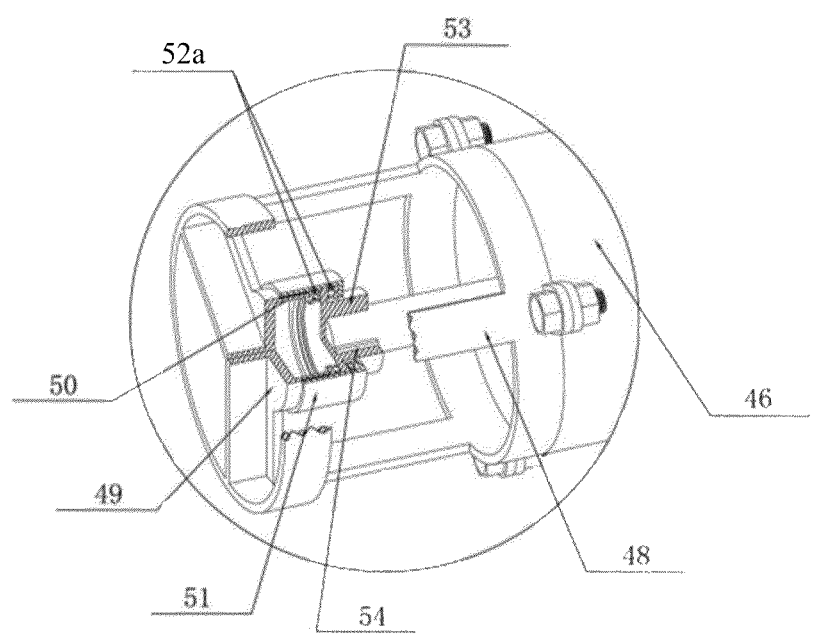
FIG. 11 is a local amplified diagram of part A in a scale storage device provided by an embodiment of the present invention.

Further, as shown in FIG. 10, outer sides of one end of the fan blade rotating shaft 57 and the rotating shaft barrel 69 on the composite rotating shaft 59 away from the corresponding rotating shaft ring 63 are provided with annular grooves 71; the inner walls of the semicircular supporting rings 58 are provided with two groups of bulges, which can be matched with the annular grooves 71 on the fan blade rotating shaft 57 and the composite rotating shaft 59 respectively; then, the semicircular supporting rings are fixedly encircled at the corresponding ends of the fan blade rotating shaft 57 and the composite rotating shaft 59 through studs, and the fan blade rotating shaft 57 and the composite rotating shaft 59 are connected; the outer sides of the semicircular supporting rings 58 are provided with the base round sleeves 14; the base round sleeves 14 are connected with the telescopic mechanisms 36; one end of the telescopic mechanisms 36 is located in the base round sleeves 14, and the other end is connected with the steering wheels 17.

Figure 15:
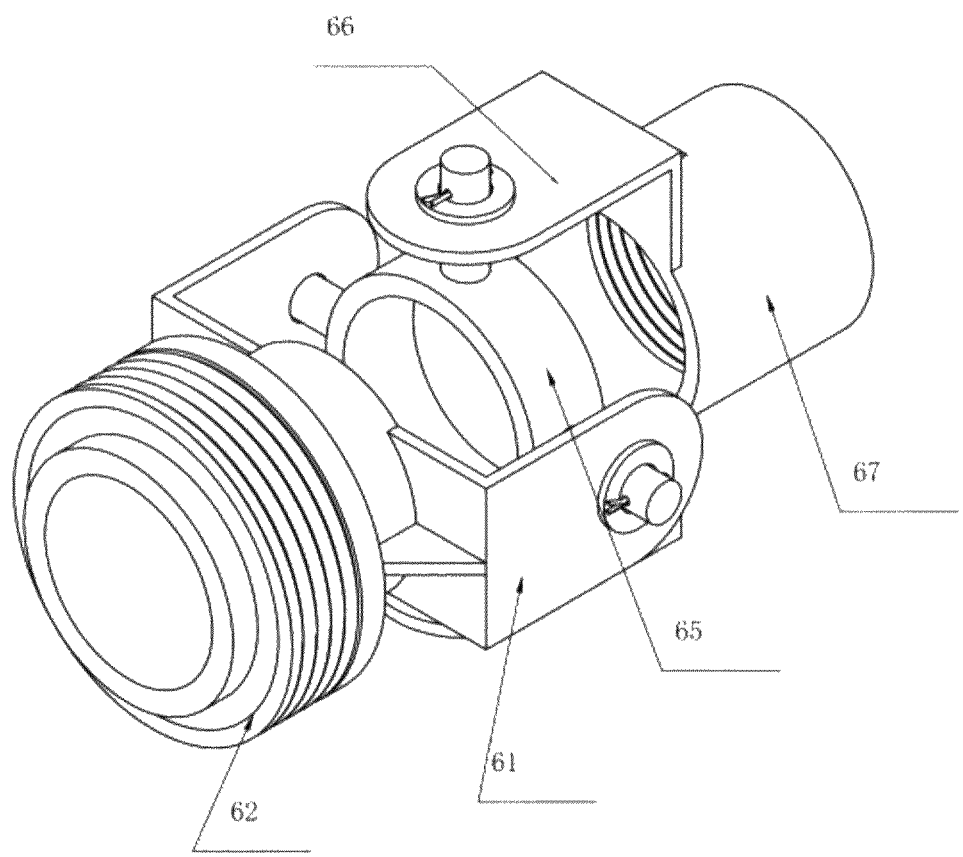
FIG. 15 is an isometric schematic diagram of a coupling provided by an embodiment of the present invention.

Further, as shown in FIG. 15, the coupling is composed of the first connecting frame 61, the threaded connector C62, a cross ring 65 and a second connecting frame 66; the cross ring is respectively connected with the first connecting frame 61 and the second connecting frame 66, and is fixed by a pin; and the coupling 3 is connected with the coupling connector at the end of the scale storage device 2 through the threaded connector C62 fixed outside the first connecting frame 61, and is connected with the threaded connector D34 in the scale remover 1 through an internal threaded pipe 67 fixed outside the second connecting frame 66.

Further, as shown in FIG. 9, each telescopic mechanism 36 is composed of a square supporting rod 37, a square sleeve 38, a rotating cylinder 39, a spring 40 and a positioning stud 41; the rotating cylinder 39 is located in the corresponding base round sleeve 14; a plurality of positioning screw holes 42 are uniformly and correspondingly distributed at the periphery of the rotating cylinder 39 and the base round sleeve 14; the positioning screw holes 42 and the positioning studs 41 are matched to limit the rotation of the rotating cylinder 39 relative to the base round sleeve 14; the upper part of the rotating cylinder 39 is fixed with the square sleeve 38; the spring 40 is arranged in the square sleeve 38; one end of the square supporting rod 37 is located in the square sleeve 38 and abutted against the spring 40, and the other end is connected with the corresponding structure; and the square supporting rod 37 expands and contracts in the square sleeve 38 under the action of external force.

Figure 16:
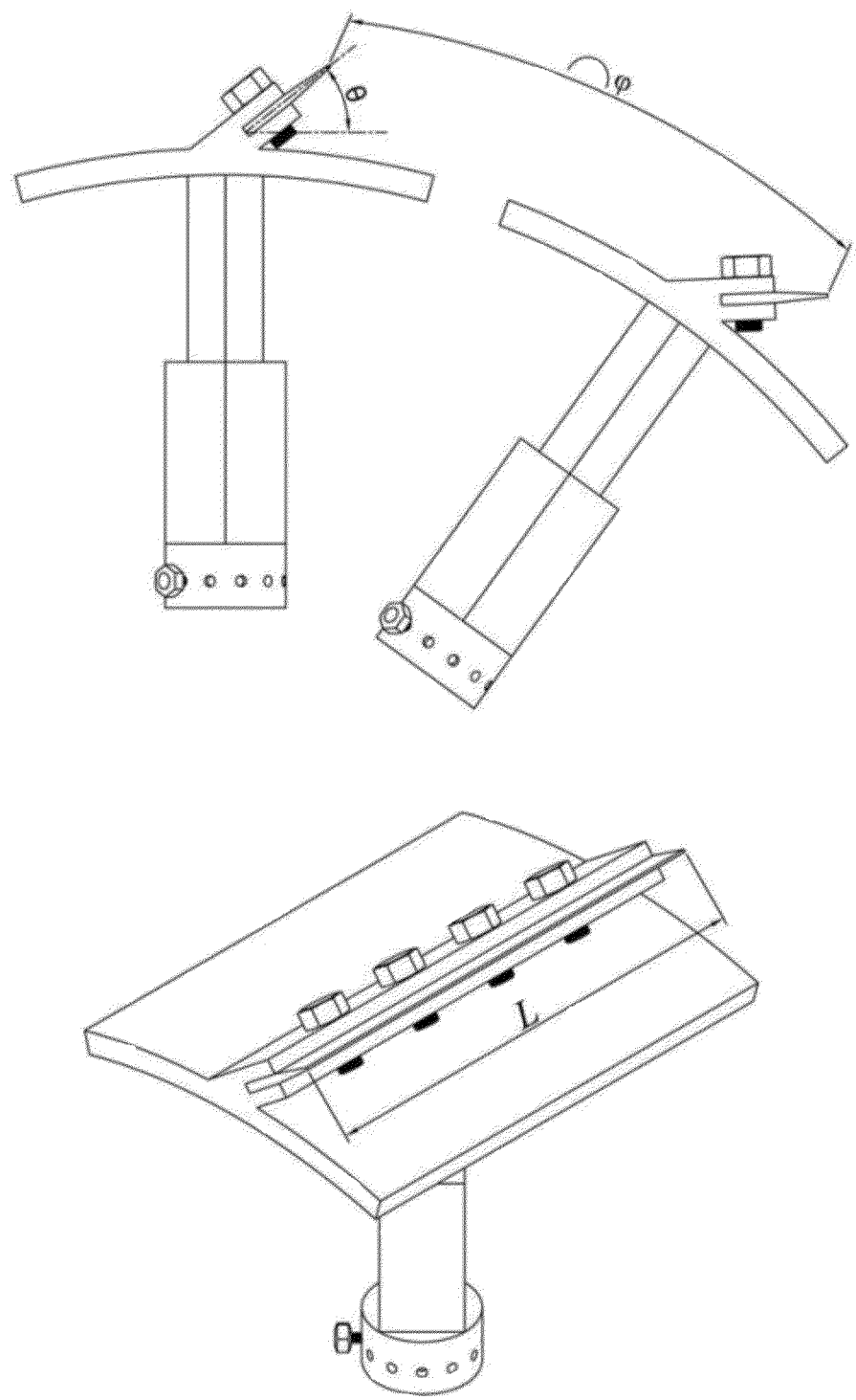
FIG. 16 is a schematic diagram of an angle and length of cutting blades and arc length between two cutting blades provided by an embodiment of the present invention.

Further, as shown in FIG. 16, an angle $\theta$ between the cutting blades 29 and a horizontal direction is less than or equal to 45 degrees; and the arc length $\varphi$ of a contact point between the two adjacent cutting blades 29 and the inner wall of the pipeline 4 shall be less than or equal to the length L of the cutting blades 29.

In addition, the present invention further provides an operation method for the above pipeline automatic scale removal and storage device, comprising the following specific steps:

a. connecting the scale breaking mechanism, the cutting mechanism and the grinding mechanism of the scale remover successively outside the pipeline, and adjusting each steering wheel through positioning studs so that an angle between each steering wheel and a pipeline axis is 45 degrees; and connecting the connected scale remover with the internal threaded pipe of the second connecting frame of the coupling;

b. connecting the composite rotating shaft and the thrust bearings through the compaction thread bushing C and the first connecting frame of the coupling;

c. assembling the barrel, the leather bowls and the end cover of the scale storage device, and placing the spiral rotating shaft in the guide cylinder; then, inserting one end of the fan blade rotating shaft into one end of the spiral rotating shaft, and making the fan blade rotating shaft and the spiral rotating shaft move synchronously through the matching between the groove and the bumps; and connecting the compaction thread bushing B with the threaded connector B to compact the fan blade rotating shaft;

d. fixedly encircling the semicircular supporting rings at one end of the fan blade rotating shaft and the composite rotating shaft through studs to ensure that the bulges of the semicircular supporting rings are completely embedded into the annular grooves; and adjusting each steering wheel through the positioning studs so that an angle between each steering wheel and the pipeline axis is 45 degrees;

e. after completing the above assembling, placing the assembled device as a whole into the pipeline; because the leather bowls of the scale storage device form seal in the pipeline, the whole device moves forward under the pressure effect of rear fluid; crushing the scale on the inner wall of the pipeline at first by the scale breaking mechanism, and driving the cutting mechanism by the steering wheels to rotate; cutting the crushed remaining scale by the cutting blades; further grinding and eliminating the scale on the inner wall of the pipeline by the grinding mechanism; rotating, by the semicircular supporting rings, with the rotation of the steering wheels, and meanwhile, rotating by the fan blade rotating shaft, the composite rotating shaft and the spiral rotating shaft; when the scale eliminated from the pipeline falls in the first connecting frame of the coupling, bringing the scale in the composite rotating shaft under the rotation effect of the spiral blade, and then entering the scale storage device through passages in the composite rotating shaft, the fan blade rotating shaft and the guide cylinder to complete the storage for the scale.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A pipeline automatic scale removal and storage device, wherein the scale removal and storage device is installed in a pipeline (4) and comprises: a scale remover (1), a scale storage device (2) and a coupling (3); and the scale remover (1) is connected with the scale storage device (2) through the coupling (3);

the scale remover (1) is composed of a scale breaking mechanism (5), a cutting mechanism (6) and a grinding mechanism (7);

the scale breaking mechanism (5) comprises a first central shaft (12), a supporting skeleton (8), a plurality of triangular disks (10) and a plurality of scale breaking teeth (11); the first central shaft (12) is fixed at the center of the supporting skeleton (8), and the first central shaft (12) is perpendicular to a plane in which the supporting skeleton (8) is located; a plurality of first base round sleeves (14a) are uniformly distributed along a circumferential direction outside the supporting skeleton (8); the plurality of first base round sleeves (14a) are connected with first telescopic mechanisms (36a); one end of each first telescopic mechanism (36a) is located in each of the first base round sleeves (14a), and the other end of each first telescopic mechanism is fixed with one of the plurality of triangular disks (10); part of the plurality of scale breaking teeth (11) are arranged at one side of each triangular disk (10) near an inner wall of the pipeline (4); and an outward triangular end of the triangular disk (10) is taken as a front end, and the front end and a rear end of the triangular disk (10) are respectively provided with a plurality of first directional wheels (9a);

the cutting mechanism (6) comprises a second central shaft (15), a cutting mechanism skeleton (16), a plurality of fixing disks (18) and cutting blades (29); a body of the cutting mechanism skeleton (16) is a supporting sheath (19); a plurality of second base round sleeves (14b) are uniformly distributed around both ends of an outer peripheral surface of the supporting sheath (19); a bearing positioning bulge (20) is arranged inside the supporting sheath (19); a first ball bearing (21a) is placed respectively at a first end of the bearing positioning bulge (20) and a second ball bearing (21b) is placed at an opposite second end of the bearing positioning bulge (20), and the second central shaft (15) is sleeved in the first and second ball bearings (21); the second central shaft (15) penetrates through the bearing positioning bulge (20), and an outer wall is in clearance fit with the inner wall of the bearing positioning bulge (20); the outer peripheral surface of the second central shaft (15) is provided with an external thread (22) and a circlip groove (23), and a pin through hole (24) is formed at the corresponding external thread (22); a circlip (25) is placed in the circlip groove (23), and the circlip limits the axial movement of the first ball bearings (21a) on the second central shaft (15); the external thread (22) is connected with a slotted lock nut (26), the slotted lock nut (26) is located in the supporting sheath (19) and the outer sides of the first ball bearings (21a), and a pin (27) is inserted into a groove of the slotted lock nut (26); the pin (27) penetrates through the slotted lock nut (26) and is inserted into the pin through hole (24) to limit the rotation of the slotted lock nut (26); the base round sleeves (14) on the outer peripheral surface of the supporting sheath (19) are connected with the telescopic mechanisms (36); one end of the plurality of telescopic mechanisms (36) corresponds one by one to the plurality of second base round sleeves (14b) located on one side of the supporting sheath (19), and the other end of each of the plurality of telescopic mechanisms is correspondingly connected with one of the plurality of fixing disks (18); the quantity of the plurality of fixing disks (18) is equal to the quantity of the second base round sleeves (14b) on the corresponding side of the supporting sheath (19); a cutting edge fixing groove (28) is arranged outside each fixing disk (18); a plurality of threaded through holes are formed on both sides of the cutting edge fixing grooves (28), and the cutting blades (29) are integrally installed in the middle; each of the cutting blades (29) are fixed with corresponding one of the cutting edge fixing grooves (28) through studs; one end of the plurality of second telescopic mechanisms (36b) corresponds one by one to the plurality of second base round sleeves (14b) located on the other side of the supporting sheath (19), and the other end is correspondingly connected with steering wheels (17);

the grinding mechanism (7) comprises a third central shaft (33), a grinding mechanism skeleton (30), a fixing bottom plate (31) and grinding blocks (32); the third central shaft (33) is fixed at the center of the grinding mechanism skeleton (30), and the third central shaft (33) is perpendicular to a plane in which the grinding mechanism skeleton (30) is located; both ends of the third central shaft (33) are respectively a threaded connector D(34) and a threaded connector E(35); the threaded connector E(35) is connected with a female adapter at one end of the second central shaft (15); a female adapter at the other end of the second central shaft (15) is connected with a threaded connector F at the end of the first central shaft (12); a plurality of third base round sleeves (14c) are uniformly distributed along a circumferential direction outside the grinding mechanism skeleton (30); the third base round sleeves (14c) are connected with third telescopic mechanisms (36c); one end of each of the third telescopic mechanisms (36c) is located in a corresponding one of the third base round sleeves (14c), and the other end of each of the third telescopic mechanisms (36c) is connected with the fixing bottom plate (31); the grinding blocks (32) are installed on one side of the fixing bottom plate (31) near the inner wall of the pipeline (4), and the grinding blocks (32) are in clearance fit with the inner wall of the pipeline (4); and a plurality of second directional wheels (9b) are installed at one end adjacent to the installing positions of the grinding blocks (32) on the fixing bottom plate (31);

one end of the coupling (3) is connected with the threaded connector D(34) in the scale remover (1), and the other end is connected with a coupling connector at the end of the scale storage device (2);

the scale storage device (2) is hermetically and movably installed in the pipeline (4), and the scale removal and storage device moves forward as a whole under the pressure action of rear fluid.

2. The pipeline automatic scale removal and storage device according to claim 1, wherein the scale storage device (2) is a barrel (43) with a hollow interior; one end of the barrel (43) is sealed, and the other end is connected with an end cover (44) through a studs; leather bowls (45) are arranged at the peripheries of both ends of the barrel (43); the leather bowls (45) are connected with the barrel (43) through studs, and the leather bowls (45) are attached to the inner wall of the pipeline (4) to form seal; a guide cylinder (46) is vertically and fixedly installed at the center of the end cover (44); a spiral rotating shaft (47) penetrates into the guide cylinder (46); one end of the guide cylinder (46) extending into the barrel (43) is connected with a rotating shaft supporting frame (48) through a stud, and one end of the rotating shaft supporting frame (48) away from the guide cylinder (46) is fixedly connected with a bracket base (49); a threaded connector A(50) is arranged at the center of the bracket base (49) toward the direction of the guide cylinder (46); a compaction thread bushing A(51) is connected and sleeved outside the threaded connector A(50); two groups of first thrust bearings (52a) are arranged in the compaction thread bushing A(51); a supporting rotating shaft (53) is clamped between the two groups of first thrust bearings (52a); the supporting rotating shaft (53) and the spiral rotating shaft (47) are connected and rotated synchronously, and a first spiral blade (60a) is installed around the spiral rotating shaft (47); one end of the guide cylinder (46) away from the rotating shaft supporting frame (48) is provided with a threaded connector B(55), and a compaction thread bushing B(56) is connected and sleeved outside the threaded connector B(55); two groups of second thrust bearings (52b) are also arranged in the compaction thread bushing B(56); a rotating shaft ring (63) outside one end of a fan blade rotating shaft (57) is clamped between the two groups of thrust bearings (52); one end of the spiral rotating shaft (47) away from the supporting rotating shaft (53) is connected with the fan blade rotating shaft (57) and rotates synchronously; the fan blade rotating shaft (57) is provided with first fan blades (70a); one end of the fan blade rotating shaft (57) away from the spiral rotating shaft (47) is connected with a composite rotating shaft (59) and rotates synchronously; the composite rotating shaft (59) is provided with second fan blades (70b) and a second spiral blade (60b); an outer ring of one end of the fan blade rotating shaft (57) connected with the composite rotating shaft (59) is encircled with two semicircular supporting rings (58); the semicircular supporting rings (58) are fixedly encircled at the corresponding ends of the fan blade rotating shaft (57) and the composite rotating shaft (59) through studs, and the fan blade rotating shaft (57) and the composite rotating shaft (59) are connected; the second spiral blade (60b) at one end of the composite rotating shaft (59) away from the fan blade rotating shaft (57) is located inside a threaded connector C(62) of a first connecting frame (61) in the coupling (3); the second rotating shaft ring(63b) outside the composite rotating shaft (59) is clamped between two groups of third thrust bearings (52c); and the threaded connector C(62) of the first connecting frame (61) is connected with a compaction thread bushing C(64) to compact the third thrust bearings (52c) corresponding to the composite rotating shaft (59).

3. The pipeline automatic scale removal and storage device according to claim 2, wherein the spiral rotating shaft (47) is composed of the first spiral blade (60a) and a first mandrel (68a); the first spiral blade (60a) is fixed around the first mandrel (68a), and both ends of the first mandrel (68a) are provided with first mandrel bumps (54a); one end of the supporting rotating shaft (53) is matched with the first mandrel bump (54a) at the corresponding end of the first mandrel (68a) through a groove to realize the synchronous rotation of the supporting rotating shaft (53) and the spiral rotating shaft (47); one end of the spiral rotating shaft (47) away from the supporting rotating shaft (53) is matched with a first mandrel groove (72a) at the end of the fan blade rotating shaft (57) through the first mandrel bumps (54a) to realize the synchronous rotation of the spiral rotating shaft (47) and the fan blade rotating shaft (57); and the outer edge of the first spiral blade (60a) on the spiral rotating shaft (47) is in clearance fit with the inner wall of the guide cylinder (46).

4. The pipeline automatic scale removal and storage device according to claim 3, wherein the fan blade rotating shaft (57) comprises a first rotating shaft barrel (69a), a first rotating shaft ring (63a), the second mandrel (68b) and the first fan blades (70a); one end of the second mandrel (68b) is provided with a second mandrel groove (72b), and the other end is provided with second mandrel bumps (54b); the first fan blades (70a) are divided into two groups uniformly distributed at both ends of the second mandrel (68b) along the circumferential direction and fixedly connected with the inner wall of the first rotating shaft barrel (69a) sleeved outside the second mandrel (68b); and the first rotating shaft ring (63a) is fixedly installed at the periphery of the end of the first rotating shaft barrel (69a).

5. The pipeline automatic scale removal and storage device according to claim 4, wherein the composite rotating shaft (59) comprises a second rotating shaft barrel (69b), a second rotating shaft ring (63b), a third mandrel (68c), second fan blades (70b) and the second spiral blade (60b); the second fan blades (70b) are fixedly connected with the inner wall of the second rotating shaft barrel (69b); the second rotating shaft ring (63b) is fixedly installed at the periphery of the end of the rotating shaft barrel; a part of the third mandrel (68c) is located in the second rotating shaft barrel (69b) and is fixed with one end of the second fan blades (70b) away from the inner wall of the second rotating shaft barrel (69b), and the other part is fixed around the second spiral blade (60b); and the outer edge of the second spiral blade is in clearance fit with the inner wall of the threaded connector C(62) of the first connecting frame (61).

6. The pipeline automatic scale removal and storage device according to claim 5, wherein an outer side of one end of the first rotating shaft barrel (69a) of the fan blade rotating shaft (57) away from the first rotating shaft ring (63a) and an outer side of one end of the second rotating shaft barrel (69b) of the composite rotating shaft (59) away from the second rotating shaft ring (63) are provided with annular grooves (71) respectively; the inner walls of the semicircular supporting rings (58) are provided with two groups of bulges, which can be matched with the annular grooves (71) on the fan blade rotating shaft (57) and the composite rotating shaft (59) respectively; the outer sides of the semicircular supporting rings (58) are provided with the second base round sleeves (14*b*); the second base round sleeves (14*b*) are connected with the second telescopic mechanisms (36); one end of each of the telescopic mechanisms (36) is located in a corresponding one of the second base round sleeves (14*b*), and the other end is connected with one of the steering wheels (17).

7. The pipeline automatic scale removal and storage device according to claim 2, wherein the coupling (3) is composed of the first connecting frame (61), the threaded connector C(62), a cross ring (65) and a second connecting frame (66); the cross ring is respectively connected with the first connecting frame (61) and the second connecting frame (66), and is fixed by a pin; and the coupling (3) is connected with the coupling connector at the end of the scale storage device (2) through the threaded connector C(62) fixed outside the first connecting frame (61), and is connected with the threaded connector D(34) in the scale remover (1) through an internal threaded pipe (67) fixed outside the second connecting frame (66).

8. The pipeline automatic scale removal and storage device according to claim 1, wherein each of the first telescopic mechanisms (36*a*), the second telescopic mechanisms (36*b*) and the third telescopic mechanisms (36*c*) is composed of a square supporting rod (37), a square sleeve (38), a rotating cylinder (39), a spring (40) and a positioning stud (41); the rotating cylinder (39) is located in a corresponding one of the first base round sleeve (14*a*), one of the second base round sleeve (14*b*) or one of the third base round sleeve (14*c*); a plurality of positioning screw holes (42) are uniformly and correspondingly distributed at the periphery of the rotating cylinder (39) and the third base round sleeve (14*c*); the positioning screw holes (42) and the positioning studs (41) are matched to limit the rotation of the rotating cylinder (39) relative to the third base round sleeves (14*c*); the upper part of the rotating cylinder (39) is fixed with the square sleeve (38); the spring (40) is arranged in the square sleeve (38); one end of the square supporting rod (37) is located in the square sleeve (38) and abutted against the spring (40), and the other end of the square supporting rod (37) is connected with one of the plurality of triangular disks (10), one of the plurality of fixing disks (18) or the fixing bottom plate (31); and the square supporting rod (37) expands and contracts in the square sleeve (38) under the action of external force.

9. The pipeline automatic scale removal and storage device according to claim 1, wherein an angle between the cutting blades (29) and a horizontal direction is less than or equal to 45 degrees; and the arc length of a contact point between each two adjacent cutting blades (29) of the cutting blades (29) and the inner wall of the pipeline (4) is less than or equal to the length of the cutting blades (29).

10. The pipeline automatic scale removal and storage device according to claim 1, wherein a plurality of ribbed plates (13) are uniformly distributed outside the first central shaft (12) and the third central shaft (33) respectively along the circumferential directions.

* * * * *